US006849082B2

(12) United States Patent
Azevedo

(10) Patent No.: US 6,849,082 B2
(45) Date of Patent: *Feb. 1, 2005

(54) METHOD FOR CURING CYANOACRYLATE ADHESIVES

(75) Inventor: Max Azevedo, Lenoir, NC (US)

(73) Assignee: Spartan Products Inc., Rye, NY (US)

( * ) Notice: Subject to any disclaimer, the term of this patent is extended or adjusted under 35 U.S.C. 154(b) by 379 days.

This patent is subject to a terminal disclaimer.

(21) Appl. No.: 09/982,226

(22) Filed: Oct. 19, 2001

(65) Prior Publication Data

US 2003/0077386 A1 Apr. 24, 2003

(51) Int. Cl.[7] ............................................. A61B 17/08
(52) U.S. Cl. ...................................... 606/214; 606/213
(58) Field of Search ............................... 424/422, 423; 606/214, 213, 88, 92–95; 156/325, 331; 528/480

(56) References Cited

U.S. PATENT DOCUMENTS

| 2,912,454 A | 11/1959 | McKeever ............... 260/465.4 |
| 3,667,472 A | 6/1972 | Halpern .................. 128/334 R |
| 3,903,055 A | 9/1975 | Buck |
| 3,975,422 A | 8/1976 | Buck ...................... 260/465.4 |
| 3,995,641 A | 12/1976 | Kronenthal et al. ........ 128/335 |
| 4,003,942 A | 1/1977 | Buck .......................... 260/464 |
| 4,012,402 A | 3/1977 | Buck ...................... 260/448.2 |
| 4,013,703 A | 3/1977 | Buck .......................... 260/464 |
| 4,041,063 A | 8/1977 | Buck ...................... 260/465.4 |
| 4,057,535 A | 11/1977 | Lipatova et al. ..... 260/77.5 AC |
| 4,182,823 A * | 1/1980 | Schoenberg ................ 526/298 |
| 4,328,170 A | 5/1982 | Okawara et al. ......... 260/465.4 |
| 4,444,933 A | 4/1984 | Columbus et al. .......... 524/292 |
| 4,818,325 A | 4/1989 | Hiraiwa et al. ............. 156/315 |
| 5,039,753 A | 8/1991 | Woods et al. ............ 525/330.3 |
| 5,192,536 A | 3/1993 | Huprich .................... 424/78.08 |
| 5,254,132 A | 10/1993 | Barley et al. ................ 606/214 |
| 5,328,687 A | 7/1994 | Leung et al. ............. 424/78.35 |
| 5,403,591 A | 4/1995 | Tighe et al. ................. 424/445 |
| 5,475,110 A * | 12/1995 | Hudkins et al. ............. 546/256 |
| 5,684,042 A | 11/1997 | Greff et al. .................. 514/527 |
| 5,749,956 A * | 5/1998 | Fisher et al. ........... 106/287.28 |
| 5,807,563 A | 9/1998 | Askill et al. ................. 424/402 |
| 5,928,611 A | 7/1999 | Leung ........................ 422/131 |
| 5,944,754 A | 8/1999 | Vacanti ......................... 623/11 |
| 5,981,621 A | 11/1999 | Clark et al. ................. 523/118 |
| 6,086,906 A | 7/2000 | Greff et al. .................. 424/407 |

(List continued on next page.)

FOREIGN PATENT DOCUMENTS

WO     WO 96/14292     5/1996

OTHER PUBLICATIONS

Collins, J.A. et al., "Biological Substrates and Cure Rates of Cyanoacrylate Tissue Adhesives", Archives of Surgery, vol. 93, Iss. 3, Sep. 1966, pp 438–32.

(List continued on next page.)

Primary Examiner—Julian W. Woo
Assistant Examiner—Jessica R. Baxter

(57) ABSTRACT

A new adhesive method using an adhesive composition including cyanoacrylate adhesive and a stabilizing agent to join together portions of a substrate, particularly useful in suturing and similar medical procedures, is disclosed. It is based on the discovery that remarkable improvements are obtained by adding a step of removing stabilizing agent from such adhesive compositions coincidently with the prior known steps of (a) providing an adhesive composition including cyanoacrylate adhesive and a stabilizing agent, (b) presenting a substrate to receive at least a portion of such cyanoacrylate adhesive and (c) applying such portion to the substrate. Devices for use in performing the method are disclosed.

9 Claims, 2 Drawing Sheets

U.S. PATENT DOCUMENTS

| | | | |
|---|---|---|---|
| 6,090,397 A | 7/2000 | Lee et al. | 424/405 |
| 6,099,807 A | 8/2000 | Leung | 422/131 |
| 6,143,352 A | 11/2000 | Clark et al. | 427/2.1 |
| 6,143,805 A | 11/2000 | Hickey et al. | 522/152 |
| 6,217,603 B1 | 4/2001 | Clark et al. | 606/214 |
| 6,245,933 B1 | 6/2001 | Malofsky et al. | 558/381 |
| 6,248,800 B1 | 6/2001 | Greff et al. | 521/71 |
| 6,294,629 B1 * | 9/2001 | O'Dwyer et al. | 526/297 |
| 6,310,166 B1 | 10/2001 | Hickey et al. | 526/348.2 |
| 2003/0158579 A1 | 8/2003 | Azevedo | |
| 2003/0158580 A1 | 8/2003 | Azevedo | |

OTHER PUBLICATIONS

Leonard, F. et al., "Interfacial Polymerization of n–Alkyl x–Cyanoacrylate Homologs", Journal of Applied Polymer Science, vol. 10, Iss. 11, Nov. 1996, pp–1617–23.

Woodward, S.C. et al., "Histotoxicity of Cyanoacrylate Tissue Adhesives in the Rat", Annals of Surgery, vol. 162, Iss. 1, Jul. 965, pp–113–22.

Cameron, J.L. et al., "Degradation of Cyanoacrylate Tissue Adhesive, pt. 1", Surgery, vol. 58, Iss. 2, Aug. 1965, pp 424–30.

Leonard, F. et al., "Synthesis and Degradation of Poly(alkyl x–Cyanoacrylates)", Journal of Applied Polymer Science, vol. 10, Iss 2, Feb. 1966, pp 259–72.

Leonard, F. et al., "Synthesis and Degradation of Poly(alkyl x–Cyanoacrylates)", Journal of Applied Polymer Science, vol. 10, Iss 2, Feb. 1966, p 1214.

Lehman, R.A.W. et al.,"Toxicity of Alkyl 2–Cyanoacrylates, Pt. 1", Archives of Surgery, vol. 93, Iss 3, Septe 1996m pp 441–46.

Yonezawa, M. et al., "Studies on x–Cyanoaculate, Pt. 6: Reaction of Cyanoacetate with Formaldehyde" Yuki Gosei Kagaku Kyokaishi, vol. 25, Iss 4, Apr. 1967, pp 311–16.

Leonard, F, "Hemostatic Applications of Alpha Cyanoacrylates: Bonding Mechanism and Physiological Degradation of Bonds", Adhesion in Biological Systems, ed. R.S. Manly, 1970, pp 185–99.

Vezin, W.R. et al., "Diffusion of Small Molecules in Poly–n–Alkyl Cyanoacrylates", Journal of Pharmacy and Pharmacology, vol. 30, Iss Suppl, Dec. 1978, p 2P.

Vezin, W.R. et al., "In Vitro Heterogeneous Degradation of Poly(n–Alkyl x–Cyanoacrylates)", Journal of Biomedical Materials Research, vol. 14, Iss 2, Mar. 1980, pp 93–106.

Tseng, Y.C. et al., "Modification of Synthesis and Investigation of Properties for 2–Cyanoacrylates", Biomaterials, vol. 11, Iss 1, Jan. 1990, pp 73–79.

* cited by examiner

METHOD FOR CURING CYANOACRYLATE ADHESIVES

BACKGROUND OF THE INVENTION

1. Field of the Invention

This invention relates broadly to a new method of curing stabilized cyanoacrylate adhesives coincidently with their application to a substrate, particularly with reference to medical procedures using such adhesives and new devices for using the method.

2. Description of the Prior Art

Medical interest in cyanoacrylate polymers was apparent in the mid-nineteen sixties as evidenced by numerous reports on its use as a tissue bonding agent. Collins, et al reported on the effectiveness of homologous chain cyanoacrylates for bonding of biological substrates (1,2). They observed high rates of polymerization with longer chain esters than the methyl or ethyl monomers. There appeared to be more biocompatability with the longer chains as noted by the ease of spreading monomer films on bio-substrates. This contrasted with in vitro polymerizations where the lower homologues reacted much faster. There was particular interest in the degradation of these polymers as they related to possible harmful effects that would preclude their use in surgery. Woodward, et al (3) reported histotoxicity of these monomers in rat tissue. The study involved in situ polymerization of three cyanoacrylate monomers: methyl, hexyl, decyl. It was reported that histotoxic effects were greatest with methyl and decreased with the other two monomers.

The same group reported on the use of radioactive methyl cyanoacrylate for monitoring routes for the loss of the polymer (4, 5). Results indicated that the polymer was degraded and excreted principally through the urine and feces. Analysis of the animal's organs revealed no signs of radioactivity. This implied no degradation products were incorporated into any of the animal's metabolic pathway. By analogy to poly-vinylidene cyanide, they noted that the cyanoacrylate polymer degraded in the presence of water and more so in the presence of bases. The first observed degradation product turned out to be one of the starting materials, i.e., formaldehyde. In vitro studies have shown that the polymers degrade via hydrolytic scission in homogeneous as well as heterogeneous conditions (6). These degradation products were confirmed to be formaldehyde and the corresponding cyanoacetate. The conditions of solution degradation affected the consequent rates, namely, under neutral conditions rates decreased as the homologous series was ascended while alkaline conditions increased all rates.

The same study reported that the hydroxyl group was evident in the polymer as the initiating species. This was concluded from infrared spectral data that displayed hydroxyl group absorption at 3600 cm(−1). Further support for this is the noted suppression of the OH as water is replaced with methanol and the observed methoxy absorption at 1100 cm(−1). Preferential initiation was shown to occur with NH2 containing substances such as pyridine, cysteine, alanine, and glycine in aqueous solutions. This suggested that in vivo adhesion was more than a mechanical interlocking of the solid polymer with the tissue. This appears to be the case as it was noted that typical polymer solvents were not effective in solvating tissue-bound polymer.

From this it would appear that in vivo studies of degradation do not necessarily correspond to in vitro conditions. Part of the degradation mechanism relies on the solution of polymer for hydrolytic scission. The chemical bonding of the polymer excludes this surface from hydrolytic activity. A mechanism of degradation was proposed that suggests an action similar to unzipping in acrylics, however, the difference being that the monomer is not regenerated. The proposed mechanism necessitates the presence of the hydroxyl as well as the presence of water.

An unusual effect was reported regarding the aqueous degradation of isobutyl cyanoacrylate (7). Of the monomers tested (methyl, propyl, butyl, isobutyl, heptyl, octyl), it was the only one that degraded more rapidly than any of the unbranched homologues, with the exception of the methyl.

A second study reported that in vivo experimentation give credence to the chain scission mechanism by hydrolysis (8). When beta-(14) carbon tagged cyanoacrylate is implanted in rats, radioactive urea is isolated from urine. This suggests that tagged formaldehyde is released, converted to carbon dioxide and in turn reacts with ammonia to produce urea (9).

Rates of degradation on ethyl, butyl, and hexyl cyanoacrylates were evaluated with regards to molecular weights, concentrations, and side chain structures (10). The method employed buffered systems of pH ranges from 5.97 to 7.88. As expected, the rates increased with increasing pH. Scanning electron microscopy of the degraded polymer indicated that reaction occurs at the surfaces and not internally through diffusion. It was postulated that the greater the length of the nalkyl side chain, the more protection provided to the labile hydroxyl end of the polymer chain. This in turn would provide greater resistance to degradation of the polymer. Degradation rates do in fact correspond to chain length protection. The relative rates of degradation for hexyl, butyl, and ethyl were, respectively, 1.0, 1.36, 9.55.

The same group reported on a study whereby degradation rates were retarded by increasing the chain length of the polymer (11). Very small quantities of impurities in the monomers had a significant impact on the final outcome of the degree of polymerization. Further to this study, within the ethoxyethyl system, longer chain length enhanced the degradation resistance of the resultant polymer.

A comparative study of ethyl cyanoacrylate and polyurethane in-situ generated adhesives and coatings were reported in U.S. Pat. No. 4,057,535. The study claimed the superiority of the polyurethane structure due to high flexibility and compatibility with the treated tissues. The single comparison was made with incised tissue and consequent application between the wound edges. Inferiority of this application for the cyanoacrylate was readily evident, but true topical applications were not compared. Of eleven examples given, four were of a topical method, yet no data was presented as no application of the ethyl or any other homologue was done conjunctively for comparative efficacy. A further deficiency of this patent is the practicality of use. No indication is given for a device to properly apply the two part system and appears to indicate an at-site preparation.

Another patent, U.S. Pat. No. 5,192,536 overcomes the apparent difficulty of U.S. Pat. No. 4,057,535 by taking preformed polyurethane and dissolving in a rapidly evaporating solvent such as tetrahydrofuran. The composition is designed to form a "membrane-like cover over the wound" and "assists in maintaining closure of the wound". Again no comparative studies were reported.

U.S. Pat. No. 3,995,641 presents the novelty of modified cyanoacrylates, namely, carbalkoxyalkyl cyanoacrylates. These also are claimed to be useful for tissue adhesives in surgical applications. The presumed superiority of these products was attributable to the rapid hydrolytic decay and concurrent low degree of histotoxicity. Since no data is presented regarding formaldehyde evolution it is presumed that the hydrolysis mechanism does not scission the polymer to generate it.

U.S. Pat. No. 5,254,132 discloses the use of a hybrid method of surgical application of cyanoacrylates. It claims a combination of sutures and adhesive such as to be mutually isolated from each other, but to both support the re-growth of the tissue in the wound area. It addresses the issue of insuring no contact of adhesive in the suture area so as to assure no inclusions of the cyanoacrylate. This method would appear to be awkward and cumbersome and require a very effective and controlled dispensing of the adhesive without contacting the suture. Additional concern is indicated as a suggestion is made to employ a solvent (acetone) if any surgical instrument happens to be bonded inadvertently to the treated area.

U.S. Pat. No. 5,328,687 attacks the formaldehyde issue by incorporating a formaldehyde scavenger such as sodium bisulfite. The various compositions were evaluated via in-vitro experimentation. The examples presented all had a presumably excessive level of scavenger. The representative compositions had loadings of 20% of a scavenging agent that was designed to offset formaldehyde emissions that were at 0.1%. As indicated previously, in-vitro and in vivo conditions are not identical and certainly not in this instance. The presented in-vitro conditions do not factor in the dynamic conditions in living tissue. The surgically treated area would be under continuous and changing fluids as the organ attempts to bring in the necessary biocomponets to heal the traumatized tissue. As such, it would not be expected that the scavenger/formaldehyde ratio would be maintained as it was in the in-vitro state. It could be speculated that the use of such high loadings of any fluid solubilized additives would contribute to greater formaldehyde emissions. This can be assumed to be a consequence of dissolution of the additives resulting in cavities in the polymer thereby promoting greater surface area for hydrolytic degradation.

U.S. Pat. No. 5,403,591 concerns the use of cyanoacrylates for treatment of skin irritations that progress to ulcerations. It would be assumed that these conditions could be considered wound formations, e.g., see U.S. Pat. No. 3,995, 641.

U.S. Pat. Nos. 5,928,611, 5,981,621, 6,099,807, 6,217, 603 describe methods of inducing cure of cyanoacrylates by passing the adhesive through a porous applicator tip containing substances that initiate the polymerization.

U.S. Pat. No. 6,143,352 describes methods of altering the pH environment of cyanoacrylates in order to attenuate or accelerate the rate of hydrolytic degradation by uses of acid and alkaline additives. The formulation of acidic modifiers is problematic as they tend to inhibit the primary characteristic of these materials, namely, rapid cure on application to tissue. Data is presented on effects of acidic compositions on previously cured cyanoacrylates.

All of these methods rely on addition of various compositions to effect the accelerated cure onto the desired substrate. These may induce polymerization by creating a greater number of initiation sites and or orientation of the monomer for more facile polymerizations. Other plausible mechanisms can be evoked, but the fact remains that these materials become a part of the composition. As such these chemical inclusions may elicit unfavorable reactions in the cured state. In particular, the use of pH-based accelerators can now contribute to the alkaline hydrolysis of the cyanoacrylate polymer.

This is particularly undesirable in medical applications of the cyanoacrylates as the hydrolysis results in the evolution of formaldehyde. A certain level of formaldehyde can be tolerated by tissue as it is able to dispose of reasonable concentrations. A solution to this was to increase the chain length of the cyanoacrylate monomer side group and in particular that it be alkyl so as to impart hydrophobic character to the resulting polymer.

The current and prior art has been able to achieve a synthesis of the octyl cyanoacrylate at economic levels for applications in the medical field, although improbable for uses in commercial applications due to reaction yields. A number of methods have been attempted to improve yields (12). The variables looked at included: azeotropes, temperature and formaldehyde/cyanoacetate ratio. Other methods have also included assessment of different catalysts for the condensation reaction. Regardless of the methods tried, yields become increasingly smaller as the cyanoacetate pendant group becomes larger.

A reported attempt to improve yields is reported in U.S. Pat. No. 6,245,933. This method attempts to avoid yield losses by producing the high yield cyanoacrylate prepolymers of the lower homologues (methyl & ethyl) and then proceed through a transesterification with a longer chain alcohol such as the octyl. Three reported examples with 2-octanol gave yields ranging from 21.8% to 36.2% of crude monomer.

From this, it can be seen that high yields are difficult and no doubt subsequent workup to medically acceptable products result in even lower product output. The difficulty with methods such as above, is the undesirable side products which are difficult to remove from the main stream. In particular, it is difficult to achieve complete transesterification reactions on polymeric moieties because of steric obstruction. As a consequence, purity is compromised as the initial cyanoacrylate prepolymer is not completely reacted and the lower homologue co-distills with the desired product.

Other additives have been used to attenuate various properties, such as modulus (elasticity), viscosity, thermal resistance, etc. Each and every additive becomes a substance that must be removed by the surrounding tissue, which generally do not assist in recovery of the damaged area. In that regard, the addition of these additives must factor the property improvement against the effect on tissue compatibility.

Objects

A principal object of the invention is the provision of a new method for curing of cyanoacrylate adhesives.

A further object is the provision of such curing methods that minimize presence of contaminates and extraneous additives in the resulting cured adhesives with particular reference to use in medical procedures.

Additional objects include:

1. Enhancing the cure speed of stabilized cyanoacrylate adhesives by destabilization treatment that removes stabilizers from them coincidently with their application onto a substrate.

2. The provision of new cyanoacrylate adhesives curing methods that allow for greater levels of stabilizers therein to be formulated to provide improved shelf life while not lowering speed of cure upon application.

3. Providing for greater latitude of storage of cyanoacrylate adhesives in packages with less regard for handling thereof.

4. Enhancing the cure speed of cyanoacrylate adhesives by a destabilization treatment that purifies such adhesive coincidently with the application onto a substrate.

5. Producing improved cured cyanoacrylate adhesives that exhibit greater biocompatability as a consequence of modified polydispersity, especially such adhesives that exhibit attenuated degradation of the polymer thereby exposing tissue contacting the adhesive to lower levels of formaldehyde.

6. The provision of improved cyanoacrylate adhesives curing methods that enable the use of difunicitional and/or multifunctional cyanoacrylates to optimize properties such as elasticity, porosity, cohesive strength and degradation rates.

7. The provision of improved cyanoacrylate adhesives curing methods that allow for greater degree of freedom in concentration of stabilizers without affecting the final chemical characteristics of such adhesives.

8. The provision of improved cyanoacrylate adhesives curing methods that allow for formulating unadulterated adhesives containing no plasticizers while achieving the elastomeric properties necessary for bonded substrates undergoing multidimensional stresses.

9. The provision of unique devices for use in carrying out the new method of the invention.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent to those skilled in the art from such descriptions.

SUMMARY OF THE INVENTION

These objects are accomplished in accordance with the invention by the provision of a method for curing reactive monomeric cyanoacrylate oligomers to undergo macromolecular formations via appropriate destabilization coincidently with their application to a substrate. Such destabilization chemically and physically removes stabilizing agents so the new method allows for greater levels of stabilizers to be formulated for improved shelf life and not result in slower curing speed upon application to a substrate. Further, this allows for greater latitude of storage in various packages with less regard for product handling.

Cyanoacrylate adhesives that exemplify this invention comprise one or more monomers having the following general structure:

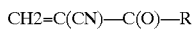

Without encumbering the body of this patent with specific examples of moieties, reference is made to the numerous patents delineating the myriad of groups that can be represented by the moiety designated as R. These are therefore intended to define and be included by general reference to such prior art and by those knowledgeable thereof.

This invention achieves this goal by removing stabilizers in cyanoacrylate adhesives coincidently with their application to substrates thereby making the resultant purified compositions highly susceptible to polymerizations as a result of contact with the substrates. In one embodiment for effectively using stabilized cyanoacrylate adhesives in accordance with the invention, they are stored in a device that houses a frangible ampoule containing such adhesives separate from particulate agent that removes stabilizers from the adhesive, but within the device. Alternatively, the frangible ampoule may contain the particulate destabilizing agent separate from the stabilized cyanoacrylate adhesive or both the stabilized cyanoacrylate adhesive and the particulate destabilizing agent may be contained in separate ampoules.

Such frangible ampoule containing devices may be constructed of any number of materials that can be shaped or molded or otherwise fabricated to contain the adhesive and ampoule. Also, it can be made from such materials as to provide a resilient wall capable of transmitting pressure to the frangible ampoule without loss of its containment properties. These application devices advantageously further comprise a filtering component and nozzle for application of the filtered and resulting destabilized adhesive to the substrate.

The application devices preferably are designed to apply the destabilized product in a continuous manner by appropriate removal of any destabilizing component. An example of such a device is one that incorporates a removable cartridge of the destabilizing agent with a reservoir of the appropriate adhesive feeding through the cartridge.

In a preferred embodiment, one of the above described devices containing isooctyl cyanoacrylate in the crushable ampoule and a weak base anion exchange resin such as "Ionac AFP329" (Sybron Chemicals, Inc.). The ampoule is crushed and contents are intermixed so as to optimize maximal contact with the isooctyl cyanoacrylate monomer for a short period of time. Upon achieving the desired consistency, the contents are then expressed through the appropriate filter and dispenser tip onto the substrate, specifically living tissue, mainly human or animal flesh and skin. The application is accomplished in such fashion as to prevent encapsulation of adhesive by any surrounding tissue. Though ultimately these inclusions are degraded and excreted, it is most desirable to minimize this occurrence to maximize reconstitution of the surrounding tissue. The need to assure this minimization was noted in U.S. Pat. No. 3,667,472 which pointed out the requisite to bridge the wound without diffusing into it. This was accomplished by bringing the wound edges together followed by application so as to effect a bridging over the wound to circumvent necrosis and irritation by this technique.

A second preferred embodiment utilizes the above described devices containing isodecyl cyanoacrylate, weak base anion exchange resin, and an appropriate difunctional cyanoacrylate to effect a composition capable of generating sufficient multiaxial strength to maintain integrity of the healing tissue.

A third preferred embodiment utilizes the above described devices containing isotridecyl cyanoacrylate and weak base anion exchange resin as the destabilizing agent.

A fourth preferred embodiment includes the above with combinations of cyanoacrylate monomers to achieve control over the rate of hydrolytic degradation so as to improve compatibility with tissue by control of formaldehyde emissions.

In preferred embodiments, the invention employs particulate ion exchange resins, molecular sieves, zeolites, chelators, and/or alkaline solids, particularly alkali metal carbonates, as destabilizing agents to remove stabilizers from solution in the cyanoacrylate adhesives. Advantageously the size of these particulate destabilizing agents will be of between Nos. 10 and 600 U.S. standard sieve series size and they will be selected to produce destabilization of the cyanoacrylate adhesive within about 1 to 5 minutes of mixing the destabilizing agent(s) with the cyanoacrylate adhesive.

Prior to use, the particulate destabilizing agent advantageously is treated to assure removal of all extraneous components that would cause initiation of polymerization. For example, in the case of weak base anion exchange resin, it is treated with distilled water followed by vacuuming to 0.20 mm Hg at 35–50 degrees centigrade.

The new method of the invention for curing stabilized cyanoacrylate adhesives coincidently with their application to a substrate is particularly useful in performing medical procedures using such adhesives, e.g., suturing human or animal flesh, providing wounds with protective covering, etc. However, it may be used in other adhesive operations, e.g., joining plumbing items, forming furniture joints, etc.

The objects are further accomplished in accordance with the invention by the provision of unique devices for using the method of the invention. Advantageously, such device is one that (a) delivers the cyanoacrylate adhesive of convenient viscosity by some degree of partial polymerization and regulated by the interval from the destabilizing operation to time of application, (b) contains a porous segment for the containment of a frangible ampoule and other components so as to permit the release of the destabilized adhesive with no particulate components being released onto the substrate to which it is applied, (c) delivers the destabilized adhesive through a nozzle to an applicator tip configured for appropriate application onto the substrate, (d) is configured with the adhesive in an isolated compartment separate from the destabilizing agent(s), that is able to release contents into contact with the destabilizing agents, (e) positions the destabilizing component in a compartment through which the ampoule-released adhesive passes as it is being delivered to the applicator tip for transfer to the substrate and (f) can be used to destabilize monomer formulations prior to application to effect the desired result.

A preferred embodiment of a device of the invention comprises a syringe having an elongated tubular chamber defined by a length of flexible tubing having a proximal end and a distal end, a dispensing tip on said distal end, means at the proximal end to apply pressure to said chamber, filter means positioned between the dispensing tip and the chamber, a frangible ampoule located within the chamber contains stabilized cyanoacrylate adhesive and particulate destabilizing agent is contained in the chamber external of the ampoule.

In an alternate embodiment of the above described device, the particulate destabilizing agent is contained in the ampoule and the cyanoacrylate adhesive is contained in the chamber external of the ampoule.

All of the preferred embodiments are meant to further include all of the various additives useful in the alteration and improvements to cyanoacrylate adhesives as would make them suitable for placement into the above devices and modifications to these devices. These can include plasticizers, stabilizers, surface insensitive additives, tougheners, thickeners, adhesion promoters and other such compositions as would be evident to those familiar with the cyanoacrylate adhesives art.

BRIEF DESCRIPTION OF THE DRAWINGS

A more complete understanding of the invention can be obtained by reference to the accompanying drawings in which.

DESCRIPTION OF PREFERRED EMBODIMENTS

Figures 1, 2, 3, 4:
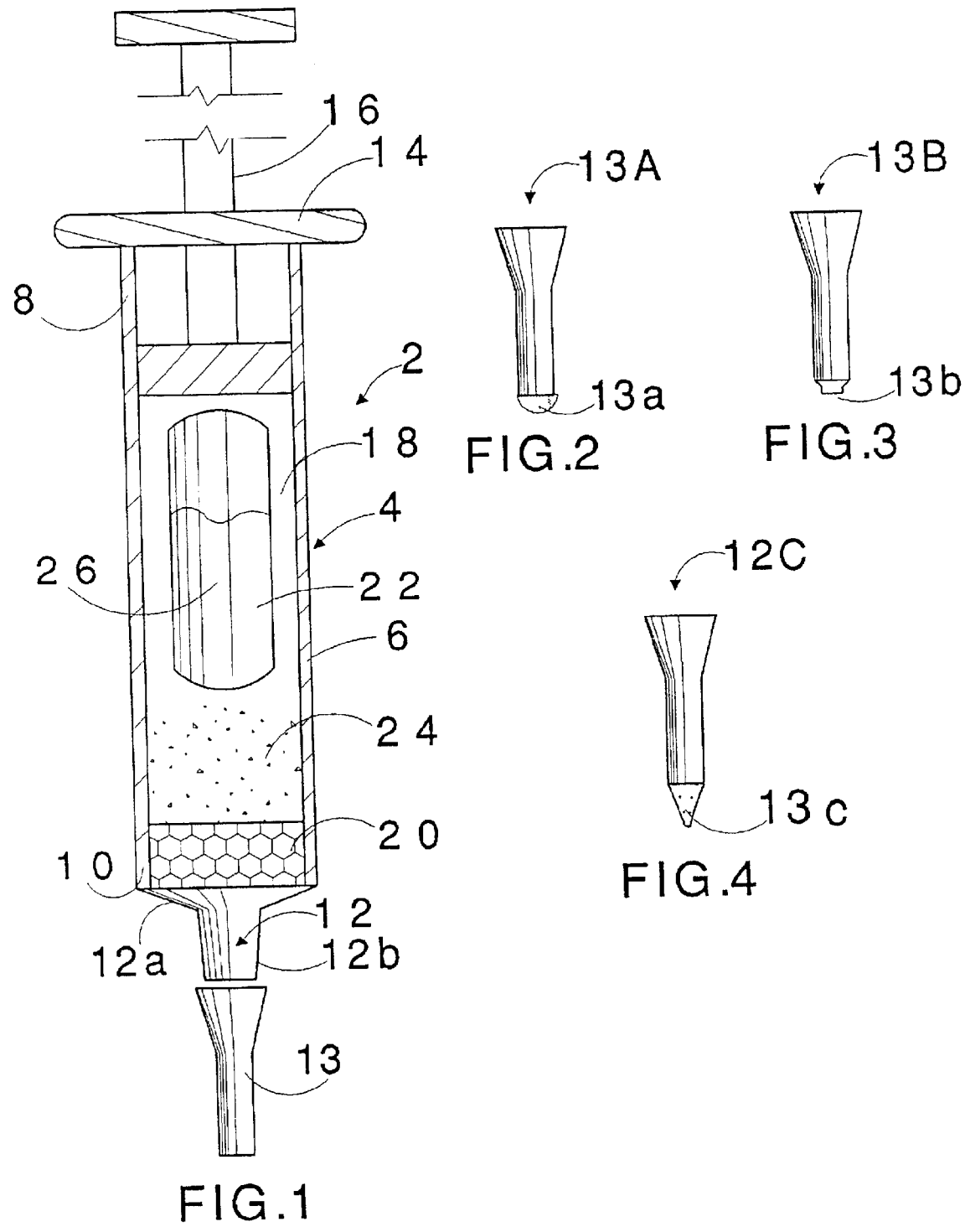
FIG. 1 is a lateral view, partially in section, of a device used in accordance with the invention for curing stabilized cyanoacrylate adhesives coincidently with their application to a substrate.
FIG. 2 is a lateral view of second embodiment of the dispensing end portion of a device as illustrated in FIG. 1.
FIG. 3 is a lateral view of third embodiment of the dispensing end portion of a device as illustrated in FIG. 1.
FIG. 4 is a lateral view of fourth embodiment of the dispensing end portion of a device as illustrated in FIG. 1.

With reference in detail to the drawings in which generic components are designated by an arrowhead line and specific components by a plain line, FIG. 1 shows a first embodiment of a device 2 of the invention for performing the new methods of the invention comprising syringe 4 having a pliable tubular section 6 partially defined by a proximal end 8 and a distal end 10 capped with a discharge member 12 defined by a dish portion 12a and tapered portion 12b plus a funnel 12c structured to operatively engage the tapered portion 12b.

A washer-like member 14 caps the proximal end 8 and admits a plunger 16 with a distal end 17 that proximally defines a chamber 18. A filter disc 20 fixed in the distal end 10 distally defines the chamber 18 within the tubular section 6.

The chamber 18 encloses a frangible ampoule 22 and a quantity of particulate destabilizing agent 24 as defined herein as an essential material of the invention. The ampoule is precharged with an adhesive composition 26 comprising cyanoacrylate adhesive and a stabilizing agent in accordance with the invention thereby being separated from the particulate destabilizing agent 24 until such time as the ampoule 22 is fragmented in carrying out the new method of the invention.

To accommodate different variations of adhesive application to substrates in accordance with the invention, the discharge member 12 can be variously structured. Thus, FIG. 2 illustrates a discharge member 12A similar to member 12, but having a hemispheric porous filter tip 12d. Also in FIG. 3, the discharge member 12B has a slotted end 12e to create a ribbon discharge of destabilized adhesive composition from the device 2 and in FIG. 4 the discharge member 12C has a nipple end 12f for drop dispensing of destabilized adhesive composition.

Figure 5:
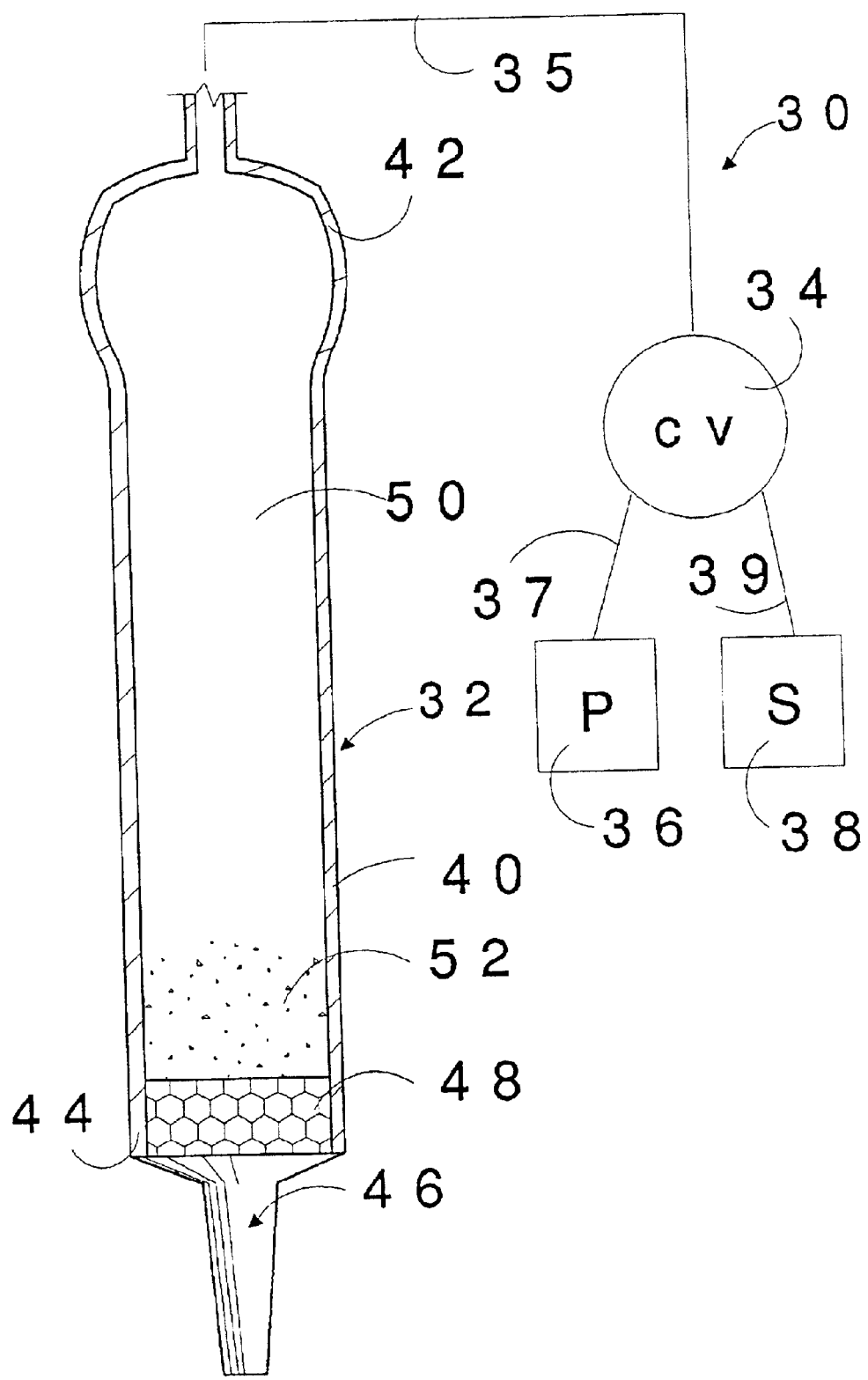
FIG. 5 is a lateral view, partially in section, of another device used in accordance with the invention for curing stabilized cyanoacrylate adhesives coincidently with their application to a substrate.

FIG. 5 shows a second embodiment of a device 30 of the invention for performing the new methods of the invention comprising syringe unit 32, a control valve 34 connected thereto by fluid line 35, a pressure source 36 connected to valve 34 by fluid line 37 and a suction source 38 connected to valve 34 by fluid line 39. Advantageously, valve 34 can be a foot operated type so a surgeon using the device 30 will have both hands free in to apply destabilized adhesive composition to a substrate in accordance with the invention.

Syringe unit 32 has a pliable tubular section 40 partially defined by a proximal end bulb 42 and a distal end 44 capped with a nozzle 46.

A filter disc 48 is fixed in the distal end 44 and distally defines an operation chamber 50 together with the tubular section 40 and the bulb 42. The chamber 50 encloses a quantity of particulate destabilizing agent 52 as defined herein as essential material of the invention. In use, the syringe unit 32 will suck a suitable amount of stabilized cyanoacrylate adhesive into the chamber from a container (not shown) through nozzle 46 when the valve 34 connects line 35 to the suction source 38. By manipulation of the pliable tubular section 40, indrawn adhesive (not shown) is mixed briefly with the destabilizing agent 52. Then, valve 34 is carefully manipulated to intermittently connect line 35 with the pressure source 36 to force resulting destabilized cyanoacrylate adhesive out of the chamber 50 via filter 48 and nozzle 46 onto the relevant substrate under the control, for example, of a surgeon. Following such an operation, the syringe unit 32 will be disconnected from the line 35 and be discarded, while the remaining units 34, 36 & 38 will be retained for repeated use with new syringe units 32.

The following preferred examples further disclose the new method and display its effectiveness. In these examples, all percentages are by weight unless otherwise indicated.

EXAMPLE 1

A quantity of particulate destabilizing agent in the form of suspension type, weak base anion exchange resin beads is treated with distilled water followed by vacuuming to 0.20 mm Hg at 35–50 degrees centigrade to remove volatiles and moisture.

Approximately 1.0 gram of iso-octyl cyanoacrylate monomer is sealed in a frangible ampoule. Such cyanoacrylate monomer has been stabilized with hydroquinone at 0.5%. The acid stabilizer, methane sulfonic acid, was introduced previously into the cyanoacrylate monomer during its synthesis at 0.25%. The cyanoacrylate monomer in the ampoule and approximately 1.0 gram of the treated anion exchange resin are individually introduced into a tubular device referred to as a Tandem Dropper supplied by James Alexander Company of Blairstown, N.J., that also provided unsealed ampoules.

In order to filter matter dispensed from the dispenser tip of the Tandem Dropper, it is plugged internally with a small wad of polyester fiber also supplied by James Alexander Company. The dispenser tip press fits onto the end of the Tandem Dropper to contain the destabilizing agent and ampoule. The assembled device is activated by crushing the ampoule. The resultant mixture is then thoroughly mixed by shaking so as to obtain optimal exposure of monomer to the destabilizing agent. Then, a plurality of spaced apart drops of the resulting destabilized adhesive are applied to human skin on the back of a hand and the time for the resulting films to undergone cure to a non-tacky surface is determined. The destabilized adhesive undergoes cure in 5–15 seconds upon application to the skin. This contrasts with untreated iso-octyl cyanoacrylate monomer which shows no sign of cure in 3 minutes.

EXAMPLE 2

A two milliliter plastic dispensing pipette is cut at the bulb end to permit charging of destabilizing agent. The pipette is a Number 3 obtained from Poly-Pipets, Incorporated of Englewood Cliffs, N.J. A ¼ inch polyester fibrous plug as described in Example 1, is inserted down into the narrow tip portion and then 0.5 grams of anhydrous granular potassium carbonate are charged into the pipette. The plug acts as a filtration barrier to contain the granular potassium carbonate.

The bulb end of the pipette is heat sealed and the resultant device is used to suction about 1 milliliter of iso-octyl cyanoacrylate monomer for mingling with the enclosed particulate. The device is positioned with the tip vertically upward and the components are intermingled by successive squeeze and release actions for a short period of time. Upon satisfactory mixing, the unit is used to apply the resulting destabilized adhesive onto to skin as thin film portions on the back of a hand. It is determined they undergo cure in 5–15 seconds. In contrast, untreated iso-octyl cyanoacrylate monomer exhibits no signs of curing for periods of 3 minutes.

This example illustrates the use of multiple applications of the adhesive from a supply of adhesive and disposable pipettes and foregoes the need for a frangible ampoule or other adhesive-isolating device.

EXAMPLE 3

A test was conducted on a wound accidentally caused by a hot surface to the inside of the left forearm. The wound, approximate dimensions of ¼ inch by 1.5 inches, had begun to slough off the burned skin exposing the underlying tissue. To evaluate the protective effect of the destabilized liquid adhesive, the device of Example 2 was used to apply destabilized iso-octyl cyanoacrylate adhesive. The wound was overlayed with a thin film and cure took place in the 15–30 second range. The applied and cured cyanoacrylate adhesive remained well attached for a period of days to the injured skin while it served to protect the covered wound area from irritation and infection by clothing or other contact as well as promote the healing process. This contrasted with prior experiences of similar wounds where the damaged tissue did not heal well due to physical contact with surrounding irritants such as clothing or other contact surfaces.

REFERENCES

1. J. A. Collins, et al., ARCH. SURG. Vol 93,428 September 1966
2. 2. F. Leonard, et al., J.A.P.S. Vol. 101617, 1966
3. S. C. Woodward, et al., ANN. SURG. Vol. 162, July 1965.
4. 4. J. J. Cameron, et al., SURGERY, Vol. 58, August 1965.
5. C. H. McKeever, U.S. Pat. No. 2,912,454, Nov. 10, 1950.
6. 6. F. Leonard, et al., J.A.P.S., Vol. 10: 259, 1966
7. R. H. Lehman et al., ARCH. SURG. Vol. 93:441,1966.
8. M. Yonezawa et al., YUKI GOSEI KAGAKU KYOKAISHI, Vol. 25, 1967.
9. F. Leonard, ADHES. BIOL. SYS. 1970.
10. W. R. Vezin et al., J. PHARM. PHARMACOL., Vol. 30, 1978, Suppl.
11. W. R. Vezin et al., J. BIOMED. MAT. RES., Vol. 93, 1980.
12. Yin-Chao Tseng et al., BIOMATERIALS, Vol 11, 1990
13. U.S. Pat. No. 4,057,353
14. U.S. Pat. No. 5,192,536
15. U.S. Pat. No. 3,995,641
16. U.S. Pat. No. 5,254,132
17. U.S. Pat. No. 5,328,687
18. U.S. Pat. No. 5,403,591
19. U.S. Pat. No. 5,928,611
20. U.S. Pat. No. 5,981,621
21. U.S. Pat. No. 6,099,807
22. U.S. Pat. No. 6,217,603
23. U.S. Pat. No. 6,143,352
24. U.S. Pat. No. 6,245,933
25. U.S. Pat. No. 3,667,472

What is claimed is:

1. A method of fabricating and using a cyanoacrylate adhesive, comprising the following steps: (a) providing an adhesive composition comprising cyanoacrylate adhesive and a stabilizing agent, (b) presenting a substrate to receive at least a portion of said cyanoacrylate adhesive and (c) applying said cyanoacrylate adhesive portion to said substrate, the improvement which comprises the step of removing stabilizing agent from said adhesive composition coincidently with said application to said substrate, wherein said step of removing stabilizing agent from said adhesive composition consists essentially of contacting said adhesive composition with a particulate agent and subsequently containing said particulate agent and said stabilizing agent while said cyanoacrylate adhesive is applied to said substrate.

2. The method of claim 1 wherein said cyanoacrylate adhesive comprises one or more monomers having the general structure $CH_2=C(CN)\text{---}C(O)\text{---}R$.

3. The method of claim 2 wherein "R" is selected from the group consisting of isooctyl cyanoacrylate, isodecyl cyanoacrylate and isotridecyl cyanoacrylate.

4. The method of claim 2 wherein said cyanoacrylate adhesive comprises a difunctional cyanoacrylate.

5. The method of claim 1 wherein said step of removing stabilizing agent from said adhesive composition comprises contacting it with particulate removal agent selected from the group consisting of ion exchange resins, activated charcoal, molecular sieves, zeolites, chelators, and alkaline solids.

6. A method of fabricating and using a cyanoacrylate adhesive, comprising the following steps: (a) providing an adhesive composition comprising cyanoacrylate adhesive and a stabilizing agent, (b) presenting a substrate to receive at least a portion of said cyanoacrylate adhesive and (c) applying said cyanoacrylate adhesive portion to said substrate, the improvement which comprises the step of fragmenting a frangible ampoule to thereby bring said adhesive composition in contact with a particulate agent that removes said stabilizing agent from said cyanoacrylate adhesive and subsequently removing said stabilizing agent from said adhesive compositon coincidently with said application to said substrate, wherein said step of removing said stabilizing agent from said adhesive composition consists essentially of contacting said adhesive composition with said particulate agent and subsequently containing said particulate agent and said stabilizing agent while said cyanoacrylate adhesive is applied to said substrate.

7. The method of claim 6 wherein said ampoule contains said cyanoacrylate adhesive separate from said particulate agent.

8. The method of claim 6 wherein said ampoule contains said particulate agent separate from said adhesive composition.

9. The method of claim 6 wherein said substrate is living tissue.

* * * * *